(12) United States Patent
Bernard

(10) Patent No.: US 7,297,752 B2
(45) Date of Patent: Nov. 20, 2007

(54) METHOD FOR CATALYTIC DIMERIZATION OF ISOCYANATES

(75) Inventor: Jean-Marie Bernard, Mornant (FR)

(73) Assignee: Rhodia Chimie, Aubervilliers (FR)

( * ) Notice: Subject to any disclaimer, the term of this patent is extended or adjusted under 35 U.S.C. 154(b) by 147 days.

(21) Appl. No.: 10/432,050

(22) PCT Filed: Nov. 20, 2001

(86) PCT No.: PCT/FR01/03648

§ 371 (c)(1),
(2), (4) Date: May 19, 2003

(87) PCT Pub. No.: WO02/40567

PCT Pub. Date: May 23, 2002

(65) Prior Publication Data

US 2004/0014970 A1    Jan. 22, 2004

(30) Foreign Application Priority Data

Nov. 20, 2000  (FR) ................... 00 14965
Nov. 20, 2000  (FR) ................... 00 14966

(51) Int. Cl.
*C08G 18/00* (2006.01)
*C07C 249/00* (2006.01)
(52) U.S. Cl. .................. 528/44; 560/355; 560/358
(58) Field of Classification Search ........ 566/330, 566/355, 336, 350, 351, 358
See application file for complete search history.

(56) References Cited

U.S. PATENT DOCUMENTS 4,031,036 A    6/1977  Koshar
4,476,054 A   10/1984  Disteldorf et al.
4,618,707 A * 10/1986  Grimm et al. ............ 560/337
5,202,358 A    4/1993  Scholl et al.
5,461,135 A * 10/1995  Malofsky et al. .......... 528/60
5,484,916 A *  1/1996  Bruchmann et al. ....... 540/202
6,538,095 B2*  3/2003  Imai et al. ................. 528/59

FOREIGN PATENT DOCUMENTS

EP          0 896 973         2/1999

OTHER PUBLICATIONS

Database WPI, Week 8950, Derwent Publications, Lt.d., London, GB, XP002174350 & JP 01 275616 A (Nov. 6, 1989).
Database WPI, Week 0029, Derwent Publications, Ltd., London, GB XP002174351 & JP 2000 103958 A (Apr. 11, 2000).

* cited by examiner

*Primary Examiner*—Karl Puttlitz
(74) *Attorney, Agent, or Firm*—Buchanan, Ingersoll & Rooney, PC

(57) ABSTRACT

The invention concerns a method for preparing polyisocyanates by cyclodimerization of isocyanate functions borne by initial monomer isocyanates. The invention is characterised in that it comprises steps which consist in: a) providing a reaction medium comprising initial monomer isocyanates, optionally in the presence of a solvent; b) adding to said reaction mixture a (cyclo)dimerization catalyst comprising a compound of the family of super acids; c) heating the reaction medium to a temperature ranging between 0° C. and 300° C., advantageously between 20° C. and 200° C. until the desired rate of transformation is obtained; d) optionally inactivating or eliminating the reaction catalyst; and e) optionally eliminating the unreacted monomer.

27 Claims, No Drawings

METHOD FOR CATALYTIC DIMERIZATION OF ISOCYANATES

The subject of the invention is a method for preparing oligomeric polyisocyanates containing at least one uretdione group by dimerization of starting monomeric isocyanates with the aid of catalysts of the superacid family.

The invention more particularly relates to a method for the catalytic cyclodimerization of monomeric isocyanates, which has a high selectivity.

Polyisocyanates containing uretdione groups, known by the name "dimers", are synthesized by cycloaddition (2+2) of two aliphatic, cycloaliphatic or aromatic isocyanate molecules.

While aromatic isocyanates can cyclodimerize in the absence of catalyst at room temperature, it is known that the other isocyanates require the use of basic catalysts such as trialkylphosphines, N,N,N',N'-tetraalkylguanidines, 1,2-dialkylimidazoles, and the like.

In general, these catalysts are however not very selective and, apart from the dimerization reaction, also promote the formation of trimeric polyisocyanates with a predominantly isocyanurate structure by cyclotrimerization of the starting monomeric isocyanates, resulting in the formation of polyisocyanate compositions having a smaller or larger proportion of compounds with isocyanurate groups apart from the polyisocyanates containing uretdione groups.

To overcome the problem of the selectivity of the dimerization catalyts, it has been proposed to use compounds falling into the generic classes of N,N-dialkylaminopyridines, 4-(N-arylalkyl-N-alkyl)aminopyridines and tris(N,N-dialkyl)phosphotriamides. Concrete examples of the first group are 4-N,N-dimethylaminopyridine (designated by "DMAP"), 4-pyrrolidinylpyridine, while a concrete example of the second group is 4-(N-benzyl-N-methyl)aminopyridine (designated by "BMAP"), and while a concrete example of the third group is hexamethylphosphotriamide (HMPT).

These catalysts, which are derived from aminopyridines, may also be useful for acylation or urethane forming reactions.

For further information, reference may be made to the work by E. F. V. Scriven, *Chem. Soc. Rev.*, 129, (1983) and by G. Hofle et al., *Angew. Chem. Int. Ed. Engl.*, 17, 569, (1978).

The work of the inventors who carried out the present invention has made it possible to demonstrate that, unexpectedly, the compounds of the superacid family constitute excellent dimerization catalysts, which make it possible to obtain dimeric polyisocyanates containing a uretdione unit with high selectivity and yield.

The expression "high selectivity" for the purposes of the invention is understood to mean that the isocyanate functional groups of the starting monomers predominantly react with each other to form compounds having uretdione groups. Compounds having isocyanurate groups may also be formed, but in a minor quantity.

The compounds may have a single uretdione group, in which case reference is made to "true dimers" or several uretdione groups, in which case reference is made to "oligodimers" or to "polydimers". The oligodimers may be in particular bis- or tris-uretdiones or heavy compounds having more than three uretdione rings and are considered as polydimers.

It is however not excluded that it may even be advantageous for the compounds of the invention to also catalyze the reaction of isocyanate functional groups with other reactive functional groups with the isocyanate functional group generally possessing functional groups with a labile hydrogen, in particular alcohol or thiol functional groups, and the like. Amines are in this case not being preferred because of the protonation of the dimerization catalyst by them.

The subject of the invention is a method for preparing polyisocyanates by cyclodimerization of isocyanate functional groups carried by starting monomeric isocyanates, characterized in that it comprises the steps of:

a. providing a reaction medium comprising starting monomeric isocyanates, optionally in the presence of a solvent;

b. adding to this reaction medium a (cyclo)dimerization catalyst comprising a compound of the superacid family;

c. heating the reaction medium at a temperature in the range between 0° C. and 300° C., advantageously from 20° C. to 200° C., until the desired rate of conversion of between 1 and 95%, advantageously 5 and 50%, of the initial isocyanate functional groups is obtained;

d. optionally inactivating or removing the reaction catalyst; and e. optionally removing the unreacted monomers.

The expression "compound of the superacid family" is understood to mean any compound, or mixture of compounds, whose acidity constant defined by Hammett is strictly less than −12. For the definition of the acidity constant according to Hammett, reference-may advantageously be made to the book by J. March, *Advanced Organic Chemistry*, third edition, John Wiley and Son, pp 223 sqq.

Thus, the superacids used in the present invention are defined as being acids whose Hammett acidity constant "H" is strictly less than −12 and, by way of example, are chosen from sulfonic acids, sulfonimides, sulfonylmethanes, phosphorus fluorides, antimony fluorides, boron fluorides (and hydrofluorides), and the like, alone or as a mixture, and derivatives thereof.

Thus, trifluoromethanesulfonic acid has an H acidity constant equal to −14, fluorosulfonic acid an H acidity constant of −15. Mixtures of superacids, such as the $FSO_3H/SbF_5$ mixture, also called "magic acid" make it possible to reach still lower H values, and for example −21 in the case of a 5% mixture of antimony pentafluoride in hydrofluoric acid.

The catalysts of the superacid family used in the method of the present invention are more particularly chosen from superacids which cannot be dehydrated, that is to say those whose chemical structure does not allow their conversion to an anhydride, under operating conditions of the reactions for dimerization of the monomeric isocyanates of the invention.

Such acids generally possess at least one highly labile hydrogen atom or can promote the formation of at least one highly labile hydrogen atom in the reaction medium. The presence of this highly labile hydrogen atom is generally due to the presence, in the chemical structure of the superacid, of at least one highly electron-attracting atom or group.

The attracting atom or group is preferably chosen from functional groups whose Hammett constant $\sigma_p$ is at least equal to 0.1. It is in addition preferable for the inductive component of $\sigma_p$, $\sigma_i$, to be at least equal to 0.2, advantageously to 0.3. In this regard, reference may be made to the book by J. March, ibid., pp. 242-250, and in particular to Table 4 of this section.

According to a first variant, the present invention provides a method of cyclodimerization as defined above in which the catalyst is advantageously a compound of the superacid family containing at least one divalent group —Y$_1$—X—Y$_2$— linked to an electron-attracting atom or group, in which:

X is chosen from NH and C(Q)H;

Y$_1$ and Y$_2$, which are identical or different, are chosen from the SO$_2$ group and the CO group;

Q is chosen from:

H, Cl, F, Br, CN;

an alkyl radical having from 1 to 30 carbon atoms;

an aryl or aralkyl radical having from 6 to 30 carbon atoms;

a group R"$_F$, a group R"$_F$SO$_2$—, or R"$_F$CO—, a group R"$_F$CH$_2$OSO$_2$— or R"$_F$CH$_2$OCO—, and a group (R"$_F$)$_2$CHO—SO$_2$— or (R"$_F$)$_2$CH$_2$O—CO—; R"$_F$ being chosen from the group consisting of fluorine, chlorine, bromine, the —CN group, the alkyl, alkenyl, haloalkyl, haloalkenyl, halocycloalkyl or halocycloalkenyl groups having from 1 to 20, preferably 1 to 6 carbon atoms, cycloalkyl, cycloalkenyl, halocycloalkyl or halocycloalkenyl groups having from 3 to 30, advantageously from 3 to 10, carbon atoms, aryl, alkylaryl or haloaryl groups having from 6 to 30, preferably 6 to 10, carbon atoms, perhaloalkyl groups having from 1 to 30 carbon atoms, (perhaloalkyl)alkoxy groups having from 2 to 30 carbon atoms, perhalogenated cycloaliphatic groups having from 3 to 30 carbon atoms optionally containing heteroatoms chosen from O, S and N and/or optionally carrying at least one perhaloalkyl grouping, and the perhalogenated aryl groups having from 6 to 30 atoms;

with the proviso that when Q represents H, then Y$_1$ and Y$_2$ each represent the —SO$_2$— group.

Advantageously, the catalyst comprises a compound of formula (I):

$$R_F—Y_1—X—Y_2—R'_F \qquad (I)$$

in which:

X, Y$_1$ and Y$_2$ are as defined above, and

R$_F$ is chosen from R$_{F1}$, R$_{F1}$CH$_2$O—; and (R$_{F1}$)$_2$CHO—;

R$_{F1}$ and R'$_F$, which are identical or different, are chosen from the group consisting of fluorine, chlorine, bromine, the CN group, alkyl, alkenyl, haloalkyl, haloalkenyl, halocycloalkyl or halocycloalkenyl groups having from 1 to 20, preferably 1 to 6 carbon atoms, cycloalkyl, cycloalkenyl, halocycloalkyl or halocycloalkenyl groups having from 3 to 30, advantageously from 3 to 10, carbon atoms, aryl, alkylaryl or haloaryl groups having from 6 to 30, preferably 6 to 10, carbon atoms, perhaloalkyl groups having from 1 to 30 carbon atoms, (perhaloalkyl)alkoxy groups having from 2 to 30 carbon atoms, perhalogenated cycloaliphatic groups having from 3 to 30 carbon atoms optionally containing heteroatoms chosen from O, S and N and/or optionally carrying at least one perhaloalkyl grouping, and perhalogenated aryl groups having from 6 to 30 atoms or one of R$_{F1}$ and R'$_F$ represents a polymer residue linked to Y$_1$ or Y$_2$ by a spacer group and provided that one of R$_{F1}$ and R'$_F$ represents a group chosen from perhaloalkyl groups having from 1 to 30 carbon atoms, (perhaloalkyl)alkoxy groups having from 2 to 30 carbon atoms, perhalogenated cycloaliphatic groups having from 3 to 30 carbon atoms optionally containing heteroatoms chosen from O, S and N and/or optionally carrying at least one perhaloalkyl grouping, and perhalogenated aryl groups having from 6 to 30 atoms; or alternatively R$_{F1}$ and R'$_F$ form together a divalent radical chosen from perfluorinated or perchlorinated linear alkylene radicals having from 2 to 20 carbon atoms, advantageously from 2 to 8 carbon atoms; or alternatively when X represents C(Q)H, R'$_F$ and R"$_F$, on the one hand, and/or R$_{F1}$ and R"$_F$, on the other hand, form together a divalent radical chosen from perfluorinated or perchlorinated, linear or branched alkylene radicals having from 2 to 20, advantageously from 2 to 8, carbon atoms, and with the proviso that when Q represents H, then Y$_1$ and Y$_2$ are SO$_2$ groups.

As particularly advantageous examples of compounds of general formula (I), there may be mentioned the sulfonimides:

FSO$_2$NHSO$_2$R'$_F$,
CF$_3$SO$_2$—NH—SO$_2$R'$_F$,
CF$_3$CH$_2$OSO$_2$NHSO$_2$R'$_F$,
(CF$_3$)$_2$CH—SO$_2$—NH—SO$_2$R'$_F$, and
(CF$_3$)$_2$CHOSO$_2$NHSO$_2$R'$_F$, in which the radical R'$_F$ is chosen from F, CF$_3$CH$_2$O, (CF$_3$)$_2$CHO, and a perfluoroalkyl group having from 1 to 20, advantageously from 1 to 10, carbon atoms, preferably —CF$_3$, —C$_2$F$_5$, —C$_4$F$_9$, —C$_6$F$_{13}$, —C$_8$F$_{17}$ and —C$_{10}$F$_{21}$.

It is also possible to mention the sulfonylmethanes:

FSO$_2$C(Q)HSO$_2$R'$_F$,
CF$_3$CH$_2$OSO$_2$C(Q)HSO$_2$R'$_F$, and
(CF$_3$)$_2$CHOSO$_2$C(Q)HSO$_2$R'$_F$, in which:

R'$_F$ is chosen from F, CF$_3$CH$_2$O, (CF$_3$)$_2$CHO, and a perfluoroalkyl group having from 1 to 20, advantageously from 1 to 10 carbon atoms, preferably —CF$_3$, —C$_2$F$_5$, —C$_4$F$_9$, —C$_6$F$_{13}$, —C$_8$F$_{17}$ and —C$_{10}$F$_{21}$, and Q is chosen from H, FSO$_2$, CF$_3$CH$_2$O—SO$_2$, (CF$_3$)$_2$CH—O—SO$_2$, an alkyl, aryl, alkylaryl or arylalkyl group having at most 30 carbon atoms, a perfluoroalkylsulfonyl group having from 1 to 8 carbon atoms, preferably CF$_3$SO$_2$, C$_2$F$_5$SO$_2$, C$_4$F$_9$SO$_2$, C$_6$F$_{13}$SO$_2$ and C$_8$F$_{17}$SO$_2$, and a perfluoroalkyl group having from 1 to 12 carbon atoms, preferably —CF$_3$, —C$_2$F$_5$, —C$_4$F$_9$, —C$_6$F$_{13}$, —C$_8$F$_{17}$ and —C$_{10}$F$_{21}$; or alternatively Q and R'$_F$ form together a perfluorinated linear divalent alkylene group having from 1 to 20, advantageously from 1 to 8, carbon atoms.

Among the compounds defined above, those which form part of the group consisting of (FSO$_2$)$_2$NH; (CF$_3$SO$_2$)$_2$—NH; CF$_3$SO$_2$NHSO$_2$C$_4$F$_9$; (FSO$_2$)$_3$CH; (FSO$_2$)$_2$CH$_2$; (CF$_3$CH$_2$OSO$_2$)$_2$NH; [(CF$_3$)$_2$CHOSO$_2$]$_2$NH; (CF$_3$CH$_2$OSO$_2$)$_2$CH$_2$; [(CF$_3$)$_2$—CHO—SO$_2$]$_2$CH$_2$; [(CF$_3$)$_2$—CHO—SO$_2$]$_3$CH; [(CF$_3$)$_2$—CHO—SO$_2$]$_3$CH; FSO$_2$NHSO$_2$CF$_3$; FSO$_2$NHSO$_2$C$_2$F$_5$; (CF$_3$)CHO—SO$_2$NHSO$_2$CF$_3$;(CF$_3$)$_2$CHOSO$_2$NHSO$_2$CF$_3$; (CF$_3$)$_2$CHOSO$_2$NHSO$_2$C$_2$F$_5$; CF$_3$CH$_2$OSO$_2$NHSO$_2$C$_2$F$_5$ and (C$_4$F$_9$SO$_2$)$_2$—NH are particularly advantageous. A most particularly preferred compound is the triflimide (CF$_3$SO$_2$)$_2$NH.

These compounds, and their method of preparation, are known and described, in particular in DE 2 239 817; FR 2 687 671; U.S. Pat. No. 5,162,177, EP 571 832 and EP 834 492.

When R$_{F1}$ or R'$_F$ represents a polymeric residue, it may be a polysiloxane, a polyether, and the like.

According to another variant of the present invention, it relates to a method of cyclodimerization as defined above in which the catalyst is advantageously a compound of the superacid family containing at least one $S(O)_mOH$ functional group, m being equal to 1 or 2, linked to an electron-attracting atom or group, or a precursor of said compound.

Advantageously, the catalyst comprises a compound of formula (II):

$$R_{F2}\text{—}S(O)_mOH \qquad (II)$$

in which $R_{F2}$ represents an electron-attracting atom or group and m represents 1 or 2.

More particularly, $R_{F2}$ may be chosen from preferably light halogen atoms, in particular fluorine and chlorine, and from hydrocarbon groups preferably $C_1$-$C_6$ hydrocarbon groups containing at least one halogen atom, preferably chosen from fluorine and chlorine.

The hydrocarbon group may be an alkyl, alkylenyl, alkynyl, aryl, aralkyl or alkylaryl group having up to 20 carbon atoms, advantageously 4 carbon atoms, at most, optionally substituted with a group which is nonreactive or reactive toward an isocyanate functional group.

Preferred electron-attracting groups are perhalogenated, in particular perchlorinated and preferably perfluorinated, $C_1$-$C_6$ hydrocarbon groups.

In general, it is preferable that the halogen atoms are carried by carbon atoms situated as close as possible to the $S(O)_mOH$ group; preferably in α or in β. They may however be carried by more distant carbon atoms. In this case, it is advantageous for the carbon atom carrying the halogen atoms to be perhalogenated, preferably perfluorinated.

A preferred group of compounds of general formula (II) is that in which $R_{F2}$ corresponds to the following general formula (II'):

$$\text{—}(CR_1R_2)_p\text{—}GEA \qquad (II')$$

in which $R_1$ and $R_2$, which are identical or different, are chosen from a hydrogen atom, a halogen atom, in particular a fluorine atom, a $C_1$-$C_6$ alkyl group, a group —$NO_2$, —CN, —COOH or —$COOR_3$ where $R_3$ is a $C_1$-$C_6$ alkyl group, a $C_1$-$C_{20}$ perfluoroalkyl or $C_6$-$C_{20}$ perfluoroaryl group, p represents an integer between 0 and 2, the symbol GEA represents the hydrogen atom, a halogen atom, in particular a fluorine atom, a $C_1$-$C_6$ alkyl, $C_6$-$C_{12}$ aryl, ($C_1$-$C_2$)alkyl($C_6$-$C_{12}$)aryl group, optionally substituted with one or more electron-attracting groups or atoms, or one electron-attracting group, with the proviso that the Hammett constant for the group —$(CR_1R_2)_p$—GEA is at least equal to 0.1.

Advantageously, the symbols $R_1$ and $R_2$, which are identical or different, represent a fluorine atom or a group $C_nF_{2n+1}$, with n being an integer between 1 and 20, advantageously 1 and 5, and preferably between 1 and 2 and GEA advantageously represents a fluorine atom or a perfluorinated residue of formula $C_nF_{2n+1}$, with n as defined above.

Among the possible definitions of $R_{F2}$, there may be mentioned in particular the following electron-attracting atoms and groups:

F, $CH_2F$, $CHF_2$, $CF_3$, $CH_2$—$CH_2F$, $CH_2$—$CHF_2$, $CH_2$—$CF_3$, $CHF$—$CH_2F$, $CHF$—$CHF_2$, $CHF$—$CF_3$, $CF_2$—$CH_3$, $CF_2$—$CH_2F$, $CF_2$—$CHF_2$, $CF_2$—$CF_3$, $CH_2$—$CH_2$—$CH_2F$, $CH_2$—$CH_2$—$CHF_2$, $CH_2$—$CH_2$—$CF_3$, $CH_2$—$CHF$—$CH_3$, $CH_2$—$CHF$—$CH_2F$, $CH_2$—$CHF$—$CHF_2$, $CH_2$—$CHF$—$CF_3$, $CH_2$—$CF_2$—$CH_3$, —$CH_2$—$CF_2$—$CH_2F$, $CH_2$—$CF_2$—$CHF_2$, $CH_2$—$CF_2$—$CF_3$, $CHF$—$CH_2$—$CH_3$, $CHF$—$CH_2$—$CH_2F$, $CHF$—$CH_2$—$CHF_2$, $CHF$—$CH_2$—$CF_3$, $CHF$—$CHF$—$CH_3$, $CHF$—$CHF$—$CH_2F$, $CHF$—$CHF$—$CHF_2$, $CHF$—$CHF$—$CF_3$, $CHF$—$CF_2$—$CH_3$, $CHF$—$CF_2$—$CH_2F$, $CHF$—$CF_2$—$CHF_2$, $CHF$—$CF_2$—$CF_3$, $CF_2$—$CH_2$—$CH_3$, $CF_2$—$CH_2$—$CH_2F$, $CF_2$—$CH_2$—$CHF_2$, $CF_2$—$CH_2$—$CF_3$, $CF_2$—$CHF$—$CF_3$, $CF_2$—$CHF$—$CH_2F$, $CF_2$—$CHF$—$CHF_2$, $CF_2$—$CHF$—$CF_3$, $CF_2$—$CF_2$—$CH_3$, $CF_2$—$CF_2$—$CH_2F$, $CF_2$—$CF_2$—$CHF_2$, $CF_2$—$CF_2$—$CF_3$, and the groups

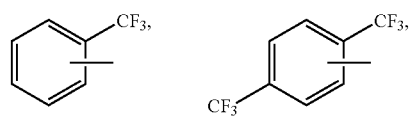

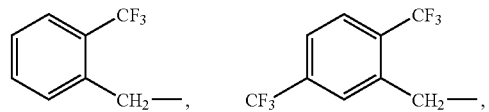

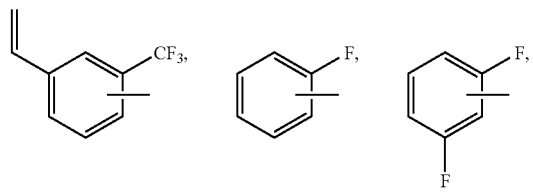

and the corresponding groups in which the fluorine atom is replaced by a chlorine atom.

A subgroup of preferred compounds of formula (II) is that in which m represents 2.

A particularly preferred compound is the triflic acid $CF_3SO_3H$.

The superacid compound which can be used in the method of the present invention as a catalyst may also be added to the reaction medium in the latent state, the latent forms generally being salts, in particular of phosphonium, sulfonium and iodonium.

Such latent forms are described in particular in U.S. Pat. No. 5,554,664, EP 834 502, U.S. Pat. Nos. 5,699,224 and 4,031,036. The active acid forms may be restored, for example, by a physical process such as heating or by means of activable energy, in particular in the case where the latent catalyst is in the form of a phosphonium salt.

For example, when the compound of general formula (II) is introduced into the reaction medium in the form of a precursor, the latter is a compound capable of releasing a compound of general formula (II) in the reaction medium under the reaction conditions. Reference is then made to a latent catalyst which regenerates the acid functional group $S(O)_mOH$ by a chemical, physical or physicochemical process.

There may be mentioned, in particular as precursor compounds for the compounds of general formula (II), ester compounds of general formula (III) or silylated compounds of general formula (IV):

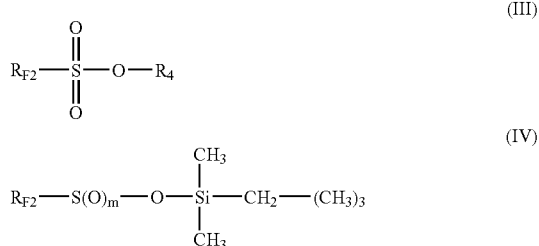

$R_{F2}$ and m being as defined above, and $R_4$ representing an alkyl radical containing from 1 to 20 carbon atoms.

There may also be mentioned energetically activable amine or onium salts such as phosphonium, sulfonium and iodonium salts. Reference may be made, for example, to the compounds described by Huang et al., *Polymer*, 41, (2000), 5001-5009.

The catalyst according to the invention may also comprise a mixture of at least two different compounds described above.

The dimerization reaction according to the invention may be carried out in the absence of a solvent or in a solvent which is not reactive with the isocyanate functional group and which is generally not reactive with the catalyst. Mention may be made in particular of chlorobenzene, toluene, trifluoromethylbenzene, n-butyl acetate, tert-butyl methyl ether, and the like.

When the catalyst is soluble in isocyanates, the reaction is preferably carried out with no solvent. Isocyanates being as a general rule scarcely polar, it will be advantageous to have catalysts exhibiting some solubility in the reaction medium. To this effect, the use of a solvent, or even of a co-solvent, may then prove effective for the method according to the invention.

The present invention is aimed at the dimerization of isocyanate compounds in general, and which preferably carry at least two isocyanate functional groups, designated in the present description by monomeric isocyanates.

They may be linear, branched or cyclic aliphatic, or even aromatic isocyanate monomers with a hydrocarbon backbone. The monomers are advantageously diisocyanates or triisocyanates.

The dimerization reaction may also be carried out starting with a mixture of various monomers, in which case the products obtained will be mixed or asymmetric dimers, oligomers or polydimers, as well as the mixtures of trimers formed.

There may be mentioned in particular, as a linear aliphatic diisocyanate monomer, hexamethylene diisocyanate (HDI), and, as branched aliphatic diisocyanate monomer, 2-methylpentamethylene diisocyanate. There may be mentioned, as triisocyanate monomer, 4-isocyanatomethyl-1,8-octamethylene diisocyanate.

Surprisingly, the method according to the invention gives very good results with scarcely reactive monomers, in particular those in which at least one isocyanate functional group is at the cycloaliphatic, secondary, tertiary or neopentyl position, and in particular with the cycloaliphatic monomers, or alternatively with the isocyanates having a branched backbone, the branch(es) being in α or β of the isocyanate functional group.

These monomers are advantageously such that at least one, advantageously both, of the isocyanate functional groups is (are) distant from the nearest ring by at most one carbon and, preferably, is (are) directly linked to it. In addition, these cycloaliphatic monomers advantageously have at least one, preferably two, isocyanate functional groups carried by a carbon atom chosen from secondary, tertiary or neopentyl isocyanate functional groups.

The method according to the invention gives very good results, including when the conformational freedom of the cycloaliphatic monomer is low. As monomers of this type, the following monomers may be mentioned by way of example:

compounds corresponding to the hydrogenation of the aromatic ring(s) carrying the isocyanate functional groups of aromatic isocyanate monomers and in particular of TDI (toluene diisocyanate) and diisocyanatobiphenyls, the compound known by the acronym $H_{12}MDI$, [4,4'-bis(isocyanato)cyclohexyl]-methane, and the various BICs [bis(isocyanatomethyl)cyclohexane] and optionally substituted cyclohexyl diisocyanates; and especially norbornane diisocyanate, often designated by its acronym NBDI;

isophorone diisocyanate or IPDI, or more precisely 3-isocyanatomethyl-3,5,5-trimethylcyclohexylisocyanate.

As aromatic monomers, there may be mentioned 2,4-toluene diisocyanate (TDI), 2,6,4,4'-diphenylmethane diisocyanate (MDI), 1,5-naphthalene diisocyanate (NDI), tolidine diisocyanate (TODI) and paraphenylene diisocyanate (PPDI).

It is possible to use diisocyanate monomers carrying functional groups which are nonreactive with the isocyanate functional group, in particular ester functional groups. By way of example, the following product:

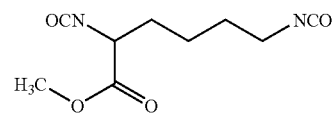

also called LDI (lysine diisocyanate) may be mentioned.

The starting monomers may also be triisocyanates such as 4-isocyanatomethyloctamethylene 1,8-diisocyanate, also called TTI or alternatively the compound of formula:

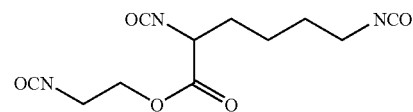

also called LTI (lysine triisocyanate).

The starting monomers may also be products of oligomerization of isocyanates of lower molecular mass, these products of oligomerization being carriers of isocyanate functional groups or prepolymers containing isocyanate functional groups of various types (polyurethane, polyester, polyacrylate, and the like). In this case, it is not necessary to separate the unconverted oligomer from the reaction product formed at the end of the dimerization reaction.

When the starting monomeric isocyanate is an oligomerization product containing an isocyanurate ring, in particular a trimeric isocyanate, the final reaction product contains isocyanurate units. However, the number of isocyanurate units is substantially that present in the starting reaction medium before the dimerization reaction.

It is also possible to use mixtures of at least one or two different compounds as defined above, in particular mixtures of isocyanate monomers of low molecular weight.

A mixed or asymmetric dimer or polydimer is obtained in this case, apart from the symmetric dimers or polydimers (obtained by dimerization of a single monomeric isocyanate of a single type of monomeric isocyanates), as well as mixed trimers.

The dimerization temperature is between 0° C. and 300° C., and advantageously between 20° C. and 200° C., preferably between 30° C. and 80° C. It will sometimes be advantageous to carry out the reaction at a temperature at which the isocyanate is in a partially or completely liquid or molten state.

When the starting monomer is IPDI, the reaction temperature is advantageously between 60° C. and 100° C., preferably at about 60° C.

The catalyst/NCO molar ratio is advantageously at least $10^{-5}$ and at most $10^{-1}$. More specifically, the $-Y_1-X-Y_2-$/NCO functional group molar ratio is advantageously at least $10^{-4}$, preferably $10^{-3}$, and at most $10^{-1}$, advantageously $5 \times 10^{-2}$. As regards the molar ratios of the $-S(O)_m$OH functional groups to the NCO functional groups of the catalyst, they generally vary between $6 \times 10^{-4}$ and $1.5 \times 10^{-2}$.

Below the lower limit, the reaction kinetics is greatly reduced, but contributes to the formation of a product of lower viscosity. Above the upper limit, problems of solubility of the catalyst in the reaction medium or of an extremely rapid reactivity may occur.

When the starting reaction medium contains an alcohol, the catalysts of the invention promote the formation of allophanate compounds, apart from dimeric compounds.

When the formation of allophanates is desired, it may be advantageous to add to the reaction medium a catalyst of the Lewis acid type, such as tin dibutyl dilaurate.

The superacid catalysts defined above also make it possible to obtain crosslinked dimeric isocyanates, by adding to the starting reaction medium a compound possessing at least two functional groups capable of reacting with the NCO functional groups. They are generally functional groups carrying an active hydrogen, for example a hydroxyl group.

There may be mentioned the optionally oligomeric or polymeric compounds containing at least one, preferably two, OH functional groups such as ethylene glycol, hexanediol, trimethylolpropane, pentaerythritol, polyethylene glycol, acrylic polyols, polyol esters. In this case too, it is possible to work in the absence or in the presence of solvent.

The destruction of the catalyst is complete when practically all the acid catalyst is neutralized or absorbed onto a support, which is preferably basic or amphoteric (silica, alumina, zeolite, and the like).

In general, the dimerization is carried out until the desired conversion rate of between 1 and 95% of the isocyanate functional groups present is obtained. For obvious economic reasons, it is preferable to stop the reaction at rates of conversion of the isocyanate functional groups of at least 5%, and preferably of between 10 and 50%. Once the dimerization reaction has stopped, the remainder of the monomers is generally removed by evaporation or distillation on a thin film or under a strong vacuum.

In the case of trifunctional monomeric compounds, this elimination of the monomers is not necessary. The elimination of the monomers is not necessary either in the case where the reaction medium is used with the aim of preparing a prepolymer.

The reaction may be stopped by destroying the catalyst, as obtained by adding a base, in particular sodium acetate, or sodium hydrogen carbonate, or alternatively by removing the catalyst, for example by its absorption onto an inorganic support, for example (silica, alumina, charcoal), distillation of the reaction medium, absorption on a basic ion-exchange resin of the tertiary amine or quaternary ammonium type whose counterion has a weaker acidity than the catalyst, in particular for example an anion ($-OH^-$, $-COO^-$ or $-COO^-$) exchange Amberlite® resin or alternatively by distillation of the reaction medium.

For the removal of the catalyst from the reaction medium, a simple filtration is sufficient, in particular in the case of a batch process.

The catalysts according to the invention make it possible to obtain polyisocyanates containing uretdione unit(s) with a high selectivity, namely a high level of true dimers. However, if the conversion rate is high, this selectivity decreases simply because of oligomerization reactions. The selectivity is particularly high for monomers carrying several isocyanate functional groups exhibiting different reactivities, for example IPDI.

The method according to the invention allows the preparation of isocyanate compositions comprising uretdione polyisocyanates. Advantageously, the final polyisocyanate composition comprises uretdione polyisocyanates, isocyanurate polyisocyanates and optionally minor heavy compounds or, where appropriate, allophanates ureas, biurets, carbonates, esters and the like.

The following nonlimiting examples illustrate the invention. Unless otherwise stated, the percentages are expressed by weight.

EXAMPLES 1 to 3

Preparation of Polyisocyanate Compositions

Reagents (% expressed by weight/weight):
IPDI=20 g.
catalyst $(CF_3SO_2)_2NH$=0.2; 0.5 and 1 g, respectively.
blocking solution, sodium acetate=0.06; 0.15 and 0.3 g, respectively.

Procedure

The reaction is carried out in a 1 L reactor with mechanical stirring, temperature regulation and bubbling of argon with a submerged tube.

The IPDI and then the catalyst are successively introduced into the reactor. The reaction medium is kept at a temperature of 60° C., with stirring. The progress of the reaction is monitored by titration of the residual isocyanate functional groups. After a total period of 5 hours, the rate of conversion of the IPDI reaches 19.1% (for a quantity of catalyst of 1%), the blocking solution (60 mg of sodium acetate per 1% of catalyst) is introduced and, 30 minutes later, the reaction mass is cooled to room temperature.

The reaction mass is distilled in a double-effect thin-layer evaporator under a vacuum of 0.5 mmHg, and at a temperature of 170° C.

The final product is a solid.

The analysis of the reaction medium before distillation of the IPDI monomer is presented below.

|                                    | Ex 1              | Ex 2              | Ex 3              |
| ---------------------------------- | ----------------- | ----------------- | ----------------- |
| Reaction conditions                |                   |                   |                   |
| Reaction temperature and time      | 60° C./5 H        | 60° C./5 H        | 60° C./5 H        |
| Nature and quantity of isocyanate  | IPDI 20 g/0.09 mol | IPDI 20 g/0.09 mol | IPDI 20 g/0.09 mol |
| Nature and quantity of the catalyst | TFSI/0.2 g        | TFSI/0.5 g        | TFSI/1 g          |
| % by weight catalyst/isocyanate    | 1%                | 2.5%              | 5%                |
| Molar quantity catalyst used       | $7.12 \times 10^{-4}$ | $1.8 \times 10^{-3}$ | $3.6 \times 10^{-3}$ |
| Molar quantity H+ function         | $7.12 \times 10^{-4}$ | $1.8 \times 10^{-3}$ | $3.6 \times 10^{-3}$ |
| H+/NCO function molar ratio        | $4 \times 10^{-3}$ | $1 \times 10^{-2}$ | $2 \times 10^{-2}$ |
| Components                         |                   |                   |                   |
| IPDI                               | 80.9%             | 71.2%             | 60.3%             |
| Rate of conversion of IPDI         | 19.1%             | 28.8%             | 39.7%             |
| True dimmer                        | 14.3%             | 17.6%             | 16.4%             |
| Trimer + bis-dimer                 |                   | 6.3%              | 7.2%              |
| Bis-dimer                          | 3.7%              |                   |                   |
| Bis-trimer                         |                   |                   | 4%                |
| Heavy materials as tris-dimer      | 1.1%              | 5.0%              | 3.7%*             |
| Ratio true dimmer/sum of the compounds | 74.9%         | 61%               | 52%               |

*presence of isocyanurate
TFSI = Bis(N,N-trifluoromethanesulfonyl)amine $(CF_3SO_2)_2$—NH/MW of TFSI = 281

EXAMPLE 4

The procedure is carried out as for Examples 1 to 3, with a quantity of catalyst equal to 5% by weight of TFSI relative to IPDI, and with the difference that 0.66 g of n-butanol is added to the starting reaction medium (that is 10 mol % relative to the IPDI used).

The composition of the reaction medium before removal of the monomeric IPDI is given in the table below:

|                                            | Example 4                  |
| ------------------------------------------ | -------------------------- |
| Reaction conditions                        |                            |
| Reaction temperature and time              | 60° C./5 H                 |
| Nature and quantity of isocyanate          | IPDI 20 g/0.09 mol         |
| Nature and quantity of the catalyst        | TFSI/1 g                   |
| % by weight catalyst/isocyanate            | 5%                         |
| Molar quantity catalyst used               | $3.6 \times 10^{-3}$       |
| Molar quantity H+ function                 | $3.6 \times 10^{-3}$       |
| H+/NCO function molar ratio                | $2 \times 10^{-2}$         |
| Nature and quantity of protic compound     | 10 mol% n-BuOH/IPDI: 0.66 g |
| Components                                 |                            |
| IPDI                                       | 50.6%                      |
| Rate of conversion of IPDI                 | 49.4%                      |
| True dimer of IPDI                         | 18.5%                      |
| IPDI and n-butyl allophanate               | 5.4%                       |
| Bis-dimer + trimer in a small quantity*    | 10.6%                      |
| Heavy materials as tris-dimer*             | 14.9%                      |
| Ratio true dimer to sum of the components outside monomer | 37.5%       |

IPDI and n-butyl allophanate functional group and trimer under the masses bis-dimer and heavy materials.

EXAMPLE 5

Preparation of a Polyisocyanate Composition with Dimeric Units Derived from HDI

The procedure is carried out as for Examples 1-3, except that the work is carried out at 100° C.

|                                            | Example 5             |
| ------------------------------------------ | --------------------- |
| Reaction conditions                        |                       |
| Reaction temperature and time              | 100° C./5 H           |
| Nature and quantity of isocyanate          | IPDI 20 g/0.09 mol    |
| Nature and quantity of the catalyst        | TFSI/0.5 g            |
| % by weight catalyst/isocyanate            | 2.5%                  |
| Molar quantity catalyst used               | $1.8 \times 10^{-3}$  |
| Molar quantity H+ function                 | $1.8 \times 10^{-3}$  |
| H+/NCO function molar ratio                | $1 \times 10^{-2}$    |
| Components                                 |                       |
| IPDI                                       | 82.4%                 |
| Rate of conversion of IPDI                 | 17.6%                 |
| True dimer of IPDI                         | 7.7%                  |
| Bis-dimer + trimer                         | 7.2%                  |
| Heavy materials                            | 2.7%                  |
| True dimer/sum of the components (except monomer) ratio | 43.75%   |

EXAMPLE 6

Reagents (% expressed by weight/weight):

IPDI=20 g catalyst=triflic acid $(CF_3SO_3H)$=0.2 g blocking agent=sodium acetate=0.5 g Procedure The reaction is carried out in a 1 L reactor with mechanical stirring, temperature regulation and bubbling of argon with a submerged tube. The isocyanate and then the catalyst are successively introduced into the reactor. The catalytic solution is introduced over 10 minutes, with stirring so as to keep the reaction medium at a temperature of 60° C. The progress of the reaction is monitored by titration of the residual isocyanate functional groups. After a total period of 6 h, the rate of conversion of the IPDI reaches about 20%. The blocking agent is introduced and, 15 minutes later, the reaction mass is cooled to room temperature.

The reaction mass is distilled in a double-effect thin-layer evaporator, at a temperature of 180° C. and under a vacuum of 0.3 mbar, in order to remove the residual isocyanate monomer.

The composition of the reaction medium before addition of the blocking agent and removal of the monomeric IPDI is given in the table below:

| Products                           | % by weight |
| ---------------------------------- | ----------- |
| IPDI                               | 81.3        |
| Dimer                              | 12.6        |
| Bis-dimer                          | 3.2         |
| Tris-dimer                         | 2.7         |
| True dimer/sum of the dimers ratio | 68          |

EXAMPLE 7

The operating conditions of Example 6 are repeated except that the quantity of $CF_3SO_3H$ added is 0.5 g and the quantity of sodium acetate is 1 g.

EXAMPLE 8

The operating conditions of Example 6 are repeated except that 0.74 g of n-butanol is added to the starting reaction medium.

EXAMPLE 9

The operating conditions of Example 7 are repeated except that 0.74 g of n-butanol is added to the starting reaction medium.

EXAMPLE 10

Example 6 is repeated using 2.5% by weight of the catalyst and by increasing the reaction temperature to 100° C.

EXAMPLE 11

Example 10 is repeated, replacing IPDI with HDI.

The composition of the final reaction medium of Examples 6 to 11 is given below:

|  | Examples | | | | | |
| --- | --- | --- | --- | --- | --- | --- |
|  | 6 | 7 | 8 | 9 | 10 | 11 |
| IPDI | 81.3% | 72.3% | 65.0% | 50.6% | 80.7% |  |
| HDI |  |  |  |  |  | 93.6% |
| Dimer | 12.6% | 16.9% | 15.7% | 18.5% | 7.3% | 1.62% |
| Bis-dimer | 3.2% | 5.5% | 7.1% |  | 4.1% | 2.5% |
| Tris-dimer | 2.7% | 5.3% | 4.0% |  |  |  |
| IPDI and butyl allophanate |  |  |  | 8.2% | 5.4% |  |
| Bis-dimer* |  |  |  | 10.6% |  |  |
| Heavy materials as tris-dimer* | — | — | 4.0% | 14.9% | 6.9% | 1.8% |
| Ratio true dimmer/ sum of the dimers | 68 | 61 | 59 |  |  |  |

*containing IPDI and butyl allophanate functional groups

The invention claimed is:

1. A method for preparing polyisocyanates by cyclodimerization of isocyanate functional groups (NCO) carried by starting monomeric isocyanates, comprising the steps of:
   a. providing a reaction medium comprising starting monomeric isocyanates, optionally in the presence of a solvent;
   b. adding to this reaction medium a (cyclo)dimerization catalyst of the superacid family having at least one highly labile hydrogen atom, the Hammett acid constant of which is less than −12;
   c. conducting the reaction at a temperature in the range between 0EC and 300EC, until the desired rate of conversion of between 1 and 95%, of the initial isocyanate functional groups is obtained;
   d. optionally inactivating or removing the reaction catalyst;
   e. optionally removing the unreacted monomers; and
   f. obtaining dimeric polyisocyanates containing at least one uretdione unit.

2. The method as claimed in claim 1, wherein the catalyst is a superacid selected from the group consisting of sulfonic acids, sulfonimides, sulfonylmethanes, alone or as a mixture, and derivatives thereof.

3. The process as claimed in claim 1, wherein the catalyst is a compound of the superacid family containing at least one divalent group —$Y_1$—X—$Y_2$— linked to an electron-attracting atom or group, in which:

X is selected from the group consisting of NH and C(Q)H;

$Y_1$ and $Y_2$, which are identical or different, are selected from the group consisting of the $SO_2$ group and the CO group;

Q is selected from the group consisting of:
   H, Cl, F, Br, CN;
   an alkyl radical having from 1 to 30 carbon atoms;
   an aryl or aralkyl radical having from 6 to 30 carbon atoms;
   a group $R''_F$, a group $R''_F SO_2$—, or R''FCO—, a group $R''_F CH_2 OSO_2$— or $R''_F CH_2 OCO$—, and a group $(R''_F)_2 CHO$—$SO_2$— or $(R''_F)_2 CH_2 O$—CO—; $R''_F$ selected from the group consisting of fluorine, chlorine, bromine, the —CN group, the alkyl, alkenyl, haloalkyl, haloalkenyl, halocycloalkyl or halocycloalkenyl groups having from 1 to 20 carbon atoms, cycloalkyl, cycloalkenyl, halocycloalkyl or halocycloalkenyl groups having from 3 to 30 carbon atoms, aryl, alkylaryl or haloaryl groups having from 6 to 30 carbon atoms, perhaloalkyl groups having from 1 to 30 carbon atoms, (perhaloalkyl)alkoxy groups having from 2 to 30 carbon atoms, perhalogenated cycloaliphatic groups having from 3 to 30 carbon atoms optionally containing heteroatoms chosen from 0, S and N and/or optionally carrying at least one perhaloalkyl grouping, and the perhalogenated aryl groups having from 6 to 30 atoms;

with the proviso that when Q represents H, then $Y_1$ and $Y_2$ each represent the —$SO_2$—group.

4. The method as claimed in claim 1, wherein the (cyclo) dimerization catalyst comprises a compound of formula (I):

$$R_F—Y_1—X—Y_2—R'_F \quad (I)$$

in which:

X is selected from the group consisting of NH and C(Q)H;

$Y_1$ and $Y_2$, which are identical or different, are selected from the group consisting of the $SO_2$ group and the CO group;

Q is selected from the group consisting of:
   H, Cl, F, Br, CN;
   an alkyl radical having from 1 to 30 carbon atoms;
   an aryl or aralkyl radical having from 6 to 30 carbon atoms;
   a group $R''_F$, a group $R''_F SO_2$—, or $R''_F CO$—, a group $R''_F CH_2 OSO_2$— or $R''_F CH_2 OCO$—, and a group $(R''_F)_2 CHO$—$SO_2$— or $(R''_F)_2 CH_2 O$ —CO—; $R''_F$ selected from the group consisting of fluorine, chlorine, bromine, the —CN group, the alkyl, alkenyl, haloalkyl, haloalkenyl, halocycloalkyl or halocycloalkenyl groups having from 1 to 20 carbon atoms, cycloalkyl, cycloalkenyl, halocycloalkyl or halocycloalkenyl groups having from 3 to 30 carbon atoms, aryl, alkylaryl or haloaryl groups having from 6 to 30 carbon atoms, perhaloalkyl groups having from 1 to 30 carbon atoms, (perhaloalkyl)alkoxy groups having from 2 to 30 carbon atoms, perhalogenated cycloaliphatic groups having from 3 to 30 carbon atoms optionally containing heteroatoms chosen from O, S and N and/or optionally carrying at least one perhaloalkyl grouping, and the perhalogenated aryl groups having from 6 to 30 atoms;

with the proviso that when Q represents H, then $Y_1$ and $Y_2$ each represent the group —$SO_2$—, $R_F$ is selected from the group consisting of $R_{Fl}$, $R_{Fl}CH_2O$—, and $(R_{Fl})_2CHO$—;

$R_{Fl}$ and $R'_F$, which are identical or different, are selected from the group consisting of fluorine, chlorine, bromine, the CN group, alkyl, alkenyl, haloalkyl, haloalkenyl, halocycloalkyl or halocycloalkenyl groups having from 1 to 20 carbon atoms, cycloalkyl, cycloalkenyl, halocycloalkyl or halocycloalkenyl groups having from 3 to 30 carbon atoms, aryl, alkylaryl or haloaryl groups having from 6 to 30 carbon atoms, perhaloalkyl groups having from 1 to 30 carbon atoms, (perhaloalkyl) alkoxy groups having from 2 to 30 carbon atoms, perhalogenated cycloaliphatic groups having from 3 to 30 carbon atoms optionally containing heteroatoms chosen from O, S and N and/or optionally carrying at least one perhaloalkyl grouping, and perhalogenated aryl groups having from 6 to 30 atoms or one of $R_{Fl}$ and $R'_F$ represents a polymer residue linked to $Y_1$ or $Y_2$ by a spacer group and provided that one of $R_{Fl}$ and $R'_F$ represents a group selected from the group consisting of perhaloalkyl groups having from 1 to 30 carbon atoms, (perhaloalkyl)alkoxy groups having from 2 to 30 carbon atoms, perhalogenated cycloaliphatic groups having from 3 to 30 carbon atoms optionally containing heteroatoms selected from the group consisting of O, S and N and/or optionally carrying at least one perhaloalkyl grouping, and perhalogenated aryl groups having from 6 to 30 atoms; or alternatively $R_{Fl}$ and $R'_F$ form together a divalent radical selected from the group consisting of perfluorinated or perchlorinated linear alkylene radicals having from 2 to 20 carbon atoms; or alternatively when X represents C(Q)H, $R'_F$ and $R''_F$, on the one hand, and/or $R_{Fl}$ and $R''_F$, on the other hand, form together a divalent radical selected from the group consisting of perfluorinated or perchlorinated, linear or branched alkylene radicals having from 2 to 20 carbon atoms, and with the proviso that when Q represents H, then $Y_1$ and $Y_2$ are $SO_2$ groups.

5. The method as claimed in claim 4, wherein said compound of general formula (I) is selected from the group consisting of the sulfonimides:

$FSO_2NHSO_2R'_F$,
$C_{F3}SO_2$—NH—$SO_2R'_F$,
$CF_3CH_2OSO_2NHSO_2R'_F$,
$(CF_3)_2CH$—$SO_2$—NH—$SO_2R'_F$, and
$(CF_3)_2CHOSO_2NHSO_2R'_F$, in which the radical $R'_F$ is selected from the group consisting of F, $CF_3CH_2O$, $(CF_3)_2CHO$, and a perfluoroalkyl group having from 1 to 20 carbon atoms.

6. The method as claimed in claim 4, wherein said compound of general formula (I) is selected from the group consisting of the sulfonylmethanes:

$FSO_2C(Q)HSO_2R'_F$,
$CF_3CH_2OSO_2C(Q)HSO_2R'_F$, and
$(CF_3)_2CHOSO_2C(Q)HSO_2R'_F$, in which:

$R'_F$ is selected from the group consisting of F, $CF_3CH_2O$, $(CF_3)_2CHO$, and a perfluoroalkyl group having from 1 to 20, advantageously from 1 to 10 carbon atoms, preferably —$CF_3$, —$C_2F_5$, —$C_4F_9$, —$C_6F_{13}$, —$C_8F_{17}$ and —$C_{10}F_{21}$, and Q is selected from H, $FSO_2$, $CF_3CH_2O$—$SO_2$, $(CF_3)_2CH$—O—$SO_2$, an alkyl, aryl, alkylaryl or arylalkyl group having at most 30 carbon atoms, a perfluoroalkylsulfonyl group having from 1 to 8 carbon atoms, and a perfluoroalkyl group having from 1 to 12 carbon atoms; or alternatively Q and $R'_F$ form together a perfluorinated linear divalent alkylene group having from 1 to 20 carbon atoms.

7. The method as claimed in claim 4, wherein the compound of general formula (I) is selected from the group consisting of $(FSO_2)_2NH$; $(CF_3SO_2)_2$—NH; $CF_3SO_2NHSO_2C_4F_9$; $(FSO_2)_3CH$; $(FSO_2)_2CH_2$; $(CF_3CH_2OSO_2)_2NH$; $[(CF_3)_2CHOSO_2]_2NH$; $(CF_3CH_2OSO_2)_2CH_2$; $[(CF_3)_2$—CHO—$SO_2]_2CH_2$; $[(CF_3)_2$—CHO—$SO_2]_3CH$; $[(CF_3)_2$—CHO—$SO_2]_3CH$; $FSO_2NHSO_2CF_3$; $FSO_2NHSO_2C_2F_5$; $(CF_3)CHO$—$SO_2NHSO_2CF_3$; $(CF_3)_2CHOSO_2NHSO_2CF_3$; $(CF_3)_2CHOSO_2NHSO_2C_2F_5$; $CF_3CH_2OSO_2NHSO_2C_2F_5$ and $(C_4F_9SO_2)_2$—NH.

8. The method as claimed in claim 7, wherein the dimerization catalyst is the triflimide $(CF_3SO_2)_2$—NH.

9. The method as claimed in claim 1, wherein the superacid catalyst contains at least one $S(O)_mOH$ functional group, m being equal to 1 or 2, linked to an electron-attracting atom or group, or a precursor of said compound.

10. The method as claimed in claim 9, wherein the electron-attracting atom or group has a Hammett constant p at least equal to 0.1.

11. The method as claimed in claim 9, wherein the catalyst is a compound of formula (II):

$$R_{F2}—S(O)_mOH \qquad (II)$$

in which $R_{F2}$ represents an electron-attracting atom or group and m represents 1 or 2.

12. The method as claimed in claim 11, wherein the catalyst is a compound of formula (II) in which $R_{F2}$ is selected from the group consisting of halogen atoms and from hydrocarbon groups.

13. The method as claimed in claim 11, wherein the catalyst is a compound of formula (II) in which $R_{F2}$ corresponds to the following general formula (II'):

$$—(CR_1R_2)_p—GEA \qquad (II')$$

in which $R_1$ and $R_2$, which are identical or different, are selected from the group consisting of a hydrogen atom, a halogen atom, a $C_1$-$C_6$ alkyl group, a group —$NO_2$, —CN, —COOR or —$COOR_3$ where $R_3$ is a $C_1$-$C_6$ alkyl group, a $C_1$-$C_{20}$ perfluoroalkyl or $C_6$-$C_{20}$ perfluoroaryl group, p represents an integer between 0 and 2, the symbol GEA represents the hydrogen atom, a halogen atom, a $C_1$-$C_6$ alkyl, $C_6$-$C_{12}$ aryl, ($C_1$-$C_2$)alkyl($C_6$-$C_{12}$) aryl group, optionally substituted with one or more electron-attracting groups or atoms, or one electron-attracting group, with the proviso that the Hammett constant for the group —$(CR_1R_2)_p$—GEA is at least equal to 0.1.

14. The method as claimed in claim 11, wherein the symbols $R_1$ and $R_2$, which are identical or different, represent a fluorine atom or a group $C_nF_{2n+1}$, with n being an integer between 1 and 20, and GEA advantageously represents a fluorine atom or a perfluorinated residue of formula $C_nF_{2n+1}$, with n as defined above.

15. The method as claimed in claim 1, wherein said electron-attracting atom or group is selected from the group consisting of:

F, $CH_2F$, $CHF_2$, $CF_3$, $CH_2$—$CH_2F$, $CH_2$—$CHF_2$, $CH_2$—$CF_3$, CHF—$CH_2F_2$, CHF—$CHF_2$, CHF—$CF_3$, $CF_2$—$CH_3$, $CF_2$—$CH_2F$, $CF_2$—$CHF_2$, $CF_2$—$CF_3$, $CH_2$—$CH_2$—$CH_2F$, $CH_2$—$CH_2$—$CHF_2$, $CH_2$—$CH_2$—$CF_3$, $CH_2$—CHF—$CH_3$, $CH_2$—CHF—$CH_2F$, $CH_2$—CHF—$CHF_2$, $CH_2$—CHF—$CF_3$, $CH_2$—$CF_2$—$CH_3$, —$CH_2$—$CF_2$—$CH_2F$, $CH_2$—$CF_2$—$CHF_2$, $CH_2$—$CF_2$—$CF_3$, CHF—$CH_2$—$CH_3$, CHF—$CH_2$—$CH_2F$, CHF—$CH_2$—$CHF_2$, CHF—$CH_2$—$CF_3$, CHF—CHF—$CH_3$, CHF—CHF—$CH_2F$, CHF—CHF—$CHF_2$, CHF—CHF—$CF_3$, CHF—$CF_2$—$CH_3$, CHF—$CF_2$—$CH_2F$, CHF—$CF_2$—$CHF_2$, CHF—$CF_2$—$CF_3$, $CF_2$—$CH_2$—$CH_3$, $CF_2$—$CH_2$—$CH_2F$, $CF_2$—$CH_2$—$CHF_2$, $CF_2$—$CH_2$—$CF_3$, $CF_2$—CHF—$CF_3$, $CF_2$—CHF—$CH_2F$, $CF_2$—CHF—$CHF_2$, $CF_2$—CHF—$CF_3$, $CF_2$—$CF_2$—$CH_3$, $CF_2$—$CF_2$—$CH_2F$, $CF_2$—$CF_2$—$CHF_2$, $CF_2$—$CF_2$—$CF_3$, and the groups

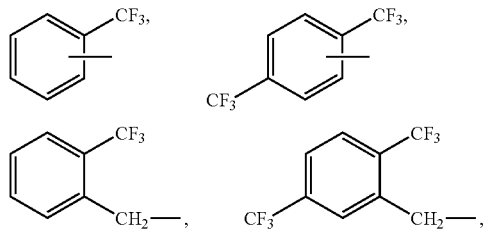

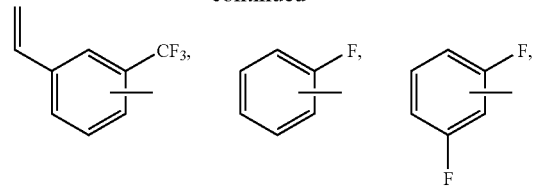

and the corresponding groups in which the fluorine atom is replaced by a chlorine atom.

16. The method as claimed in claim 9, wherein m is equal to 2.

17. The method as claimed in claim 9, wherein the dimerization catalyst is the triflic acid $CF_3SO_3H$.

18. The method as claimed in claim 1, for the cyclodimerization of monomers in which at least one isocyanate functional group is at the cycloaliphatic, secondary, tertiary or neopentyl position.

19. The method as claimed in claim 18, wherein the starting monomer is IPDI.

20. The method as claimed in claim 1, wherein the catalyst/NCO molar ratio is at least $10^{-5}$ and at most $10^{-1}$.

21. The method as claimed in claim 3, wherein the $Y_1$—X—$Y_2$/NCO functional group molar ratio is at least $10^{-4}$.

22. The method as claimed in claim 21, wherein the $Y_1$—X—$Y_2$/NCO functional group molar ratio is at most $10^{-1}$.

23. The method as claimed in claim 9, wherein the molar ratio of the $S(O)_mOH$ functional groups relative to the NCO functional groups of the catalyst is between $6H10^{-4}$ and $1.5H10^{-2}$.

24. The method as claimed in claim 1, wherein an alcohol is added to the reaction medium so as to form allophanates in addition to the dimers.

25. The method as claimed in claim 1, wherein a polyol is added to the reaction medium so as to form crosslinked dimers.

26. An isocyanate composition, comprising uretdione polyisocyanates, which can be obtained by the method as defined in claim 1.

27. The method as claimed in claim 2, wherein the catalyst further includes a phosphorus fluoride, an antimony fluoride, or a boron fluoride or hydrofluorides thereof, alone or as a mixture, or derivatives thereof.

* * * * *